United States Patent
Sigmans

(10) Patent No.: US 7,306,004 B2
(45) Date of Patent: Dec. 11, 2007

(54) DEVICE FOR THE METERED PASSAGE OF A LIQUID

(75) Inventor: Marinus Antonius Johannes Maria Sigmans, Heeswijk-Dinther (NL)

(73) Assignee: Sibo B.V., Veghel (NL)

( * ) Notice: Subject to any disclaimer, the term of this patent is extended or adjusted under 35 U.S.C. 154(b) by 310 days.

(21) Appl. No.: 11/124,567

(22) Filed: May 5, 2005

(65) Prior Publication Data

US 2005/0258188 A1    Nov. 24, 2005

(30) Foreign Application Priority Data

May 7, 2004    (NL) .................................. 1026138

(51) Int. Cl.
*F16K 31/18*    (2006.01)

(52) U.S. Cl. ..................................... 137/433

(58) Field of Classification Search ............... 137/430, 137/433, 429, 572; 4/490, 508, 512
See application file for complete search history.

(56) References Cited

U.S. PATENT DOCUMENTS

| | | | |
|---|---|---|---|
| 899,659 A * | 9/1908 | Craddock et al. | 137/433 |
| 2,729,337 A | 1/1956 | Alferman | |
| 3,212,268 A * | 10/1965 | Ortega | 405/60 |
| 3,252,576 A * | 5/1966 | Miller | 210/137 |
| 3,716,873 A * | 2/1973 | Blum | 4/512 |
| 4,173,799 A * | 11/1979 | Patterson | 4/510 |
| 4,498,984 A * | 2/1985 | Colson | 210/122 |
| 4,608,167 A * | 8/1986 | Raubenheimer | 210/242.1 |
| 6,701,542 B2 * | 3/2004 | Marbach | 4/507 |

FOREIGN PATENT DOCUMENTS

| | | |
|---|---|---|
| DE | 349771 | 3/1922 |
| DE | 3439406 | 4/1986 |

* cited by examiner

*Primary Examiner*—Gregory Huson
*Assistant Examiner*—Craig M. Schneider
(74) *Attorney, Agent, or Firm*—Fulbright & Jaworski

(57) ABSTRACT

The invention provides a device for the metered passage of a liquid, comprising a container for the liquid, which is provided with an inlet and an outlet for supplying liquid to and discharging liquid from the container, respectively, and with a bottom and upright side walls joining said bottom. The device furthermore comprises means for regulating the extent to which liquid is supplied to the container via the inlet in dependence on the amount of liquid that is present in the container. The metering means comprise a floating element which floats on the liquid in the container and which is rigidly connected to an overflow edge that can move up and down together with the floating element between a lowermost position and an uppermost position, over which overflow edge the liquid flows into the container at the location of the inlet. The overflow edge forms part of at least one side wall of the container.

13 Claims, 5 Drawing Sheets

DEVICE FOR THE METERED PASSAGE OF A LIQUID

BACKGROUND

The present invention relates to a device for the metered passage of a liquid, comprising a container for the liquid, which is provided with an inlet and an outlet for supplying liquid to and discharging liquid from the container, respectively, and with a bottom and upright side walls joining said bottom, as well as metering means for regulating the extent to which liquid is supplied to the container via the inlet in dependence on the amount of liquid that is present in the container, said metering means comprising a floating element which floats on the liquid in the container and which is rigidly connected to an overflow edge that can move up and down together with the floating element between a lowermost position and an uppermost position, over which overflow edge the liquid flows into the container at the location of the inlet.

At the time of the present invention mention is made, both on the Internet (www.pondflow.com) and in advertisements, of a mechanical filter system known by the trade names PondSieve® and PondFlow®, with reference being made to patent (application) numbers 102279 as well as 1022779. Said system makes use of a reservoir in which a screen bend is disposed. A liquid, such as pond water, is supplied to the reservoir via a supply pipe that opens into the bottom of a separate container fitted with an overflow edge. Liquid that flows over said overflow edge falls on the screen bend, which cleans the liquid in that parts that are too large remain behind on the upper side of the screen, from which they are discharged in downward direction. Under the screen bend, the reservoir is filled with liquid that has already passed the screen bend, which liquid is sucked in by a pump. A floating element floats on the liquid in the reservoir, which floating element is connected to the overflow edge via a rod, so that said container moves up and down in its entirety together with the floating element, depending on the level of the liquid in the lower part of the reservoir. In connection with said up-and-down movement of the container, which has a limited capacity, the supply pipe is provided with a flexible, bellows-like portion, whose length can be varied. The level of the container provided with the overflow edge will rise along with the liquid level in the reservoir, so that the amount of liquid that flows over the overflow edge will decrease, as a result of which the liquid level in the reservoir will fall again, providing that the pump will continue to discharge liquid from the reservoir, and more liquid will flow over the overflow edge again. In this way a self-regulating system has been created.

SUMMARY

It is a first object of the present invention to provide a device as referred to in the introduction which is of simpler construction than the prior art device as described above, and which has a lower cost price, therefore. In order to accomplish that object, the overflow edge forms part of at least one side wall of the container. Because of this aspect, it is no longer necessary to use a separate container, as in the known device, but use is made instead of at least one side wall of the container of which the vertically movable overflow edge forms part, which at least one side wall is in itself necessary anyway for forming the container. This enables a very simple construction of the device according to the invention, so that it is possible to realise a relatively low cost price.

In a greatly preferred embodiment, said at least one side wall, of which the overflow edge forms part, comprises a fixed side wall portion and a movable side wall portion capable of movement along said fixed side wall portion, with the upper edge of the movable side wall portion forming the overflow edge. In particular when configured in this manner, a simple construction can be used for the device according to the invention. Preferably, sealing means are present between the fixed side wall portion and the movable side wall portion to prevent liquid from finding its way from the container between the fixed side wall portion and the movable side wall portion.

Preferably, the movable side wall portion is located on the side of the fixed side wall portion that faces towards the interior of the container. In this way a constructionally simple connection can be realised between the floating element and the movable side wall portion.

Furthermore preferably, the floating element is directly attached to the movable side wall portion. This aspect obviates the need to provide separate facilities for connecting the floating element to the overflow edge.

To obtain a correct movement of the movable side wall portion along the fixed side wall portion, guide means are preferably provided for guiding the movement of the movable side wall portion along the fixed side wall portion.

Said guide means preferably comprise grooves on sides of the two side walls that face towards the interior of the container, within which grooves edges of the movable side wall portion are slidably accommodated. The assembly and maintenance, such as cleaning, of a device according to the invention becomes simpler when such an embodiment is used.

In order to achieve that sufficient liquid will be available for being supplied to the container at all times under normal conditions of use, a buffer container comprising a bottom and upright side walls joining said bottom is provided for keeping liquid upstream of the inlet of the container.

Again for reasons of constructional simplicity it is preferable in that case if said at least one side wall of the container of which the overflow edge forms part also forms a side wall of the buffer container. The side wall in question can be regarded as a common side wall, therefore, so that a further reduction of the required number of parts of the device is obtained.

It is furthermore greatly preferred in that connection if the bottom of the container and the bottom of the buffer container are in line and/or if at least one side wall of the container and at least one side wall of the buffer container are in line. In this way it is possible to make the bottoms in question as well as the side walls in question of one piece of sheet material, thus realising a further reduction of the required number of parts of the device according to the invention.

A smooth flow of liquid over the overflow edge from the buffer container into the container is promoted if the buffer container has an inlet that is provided in the lower half of an upright side wall thereof. In general it obtains that when a buffer container is used, a number of variants as regards the dimensioning of the inlet are possible, for example as regards the number of inlet openings or the diameter thereof.

To prevent any tendency of the overflow edge, the floating element and/or the rigid connection therebetween, which may be made up of a movable side wall portion, to move not only in vertical direction but also in horizontal direction, which may lead to increased wear and a decreased sealing effect, it is furthermore preferable for the floating element to be provided directly below the overflow edge, so that the occurrence of tilting moments is prevented.

It is furthermore very advantageous if adjusting means are provided for adjusting the distance between the floating element and the overflow edge, so that said distance can be optimally geared to the specific situation in which the device according to the invention is used.

Especially if the inlet of the container is in direct communication with a pond, it will be very advantageous if the overflow edge, in the uppermost position thereof, is positioned maximally 1.0 cm below the upper sides of side walls of the container without the overflow edge. It will be apparent that when the overflow edge, in the uppermost position thereof, is positioned at the highest possible liquid level of the pond, the supply of liquid to the container will be completely shut off in said uppermost position of the overflow edge, with the upper sides of the side walls of the container projecting maximally 1.0 cm above the uppermost level of the pond, which, in a garden-like environment, allows the designer of a garden more freedom in designing the garden because the designer is not bound by a substantial local elevation at the location of the device according to the invention.

The device according to the invention is in particular, but not exclusively, suitable for use as a device for cleaning liquid. Consequently, the container is preferably provided with a cleaning element, such as a screen or filter element, for cleaning liquid that flows from the inlet of the container to the outlet of the container.

The invention will be explained in more detail hereinafter in the description of a preferred embodiment of a device according to the invention, in which reference is made to the following figures.

DETAILED DESCRIPTION

Figure 1:
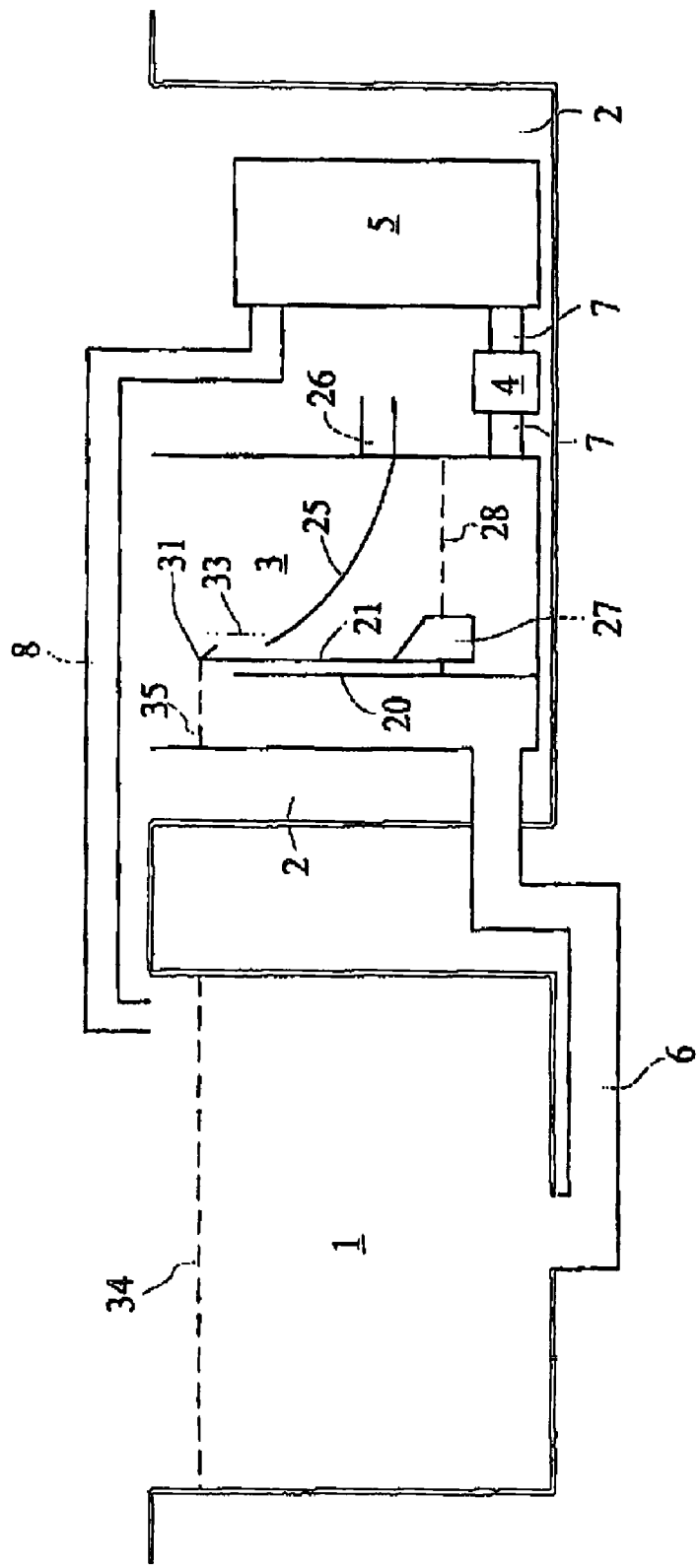
FIG. 1 is a schematic side elevation of the preferred embodiment of a device according to the invention, including the environment thereof.

FIG. 1 shows a pond 1, for example for ornamental fish, such as Koi. Beside the pond 1 is a pit 2, which has the same depth as the pond 1 in FIG. 1, although this is not at all relevant for the present invention. Disposed in the pit 2 is a screening device 3 according to a preferred embodiment of a device according to the invention. In addition to that, a pump 4 and a filter system 5 are disposed in the pit 2. The pond 1 and the screening device 3 communicate with each other via a pipe 6, through which water from the pond 1 is transported to the screening device 3. The screening device 3 and the filter system 5 are interconnected via a pipe 7, in which a pump 4 is mounted, which pumps water from the screening device 3 to the filter system 5. A supply pipe 8 extends from said filter system 5 for supplying (screened and filtered) pond water from the filter system 5 to (the upper side of) the pond 1. In this way a circuit has been created, within which pond water is circulated by the pump 4 to be exposed to, successively, the screening action of the screening device 3 and the filtering action of the filter system 5. In practice, the pit 2 will be closed at the upper side by a cover plate or the like, in which connection it is noted that the upper side of the screening device 3 is level with the upper side of the pond 1.

Figure 2:
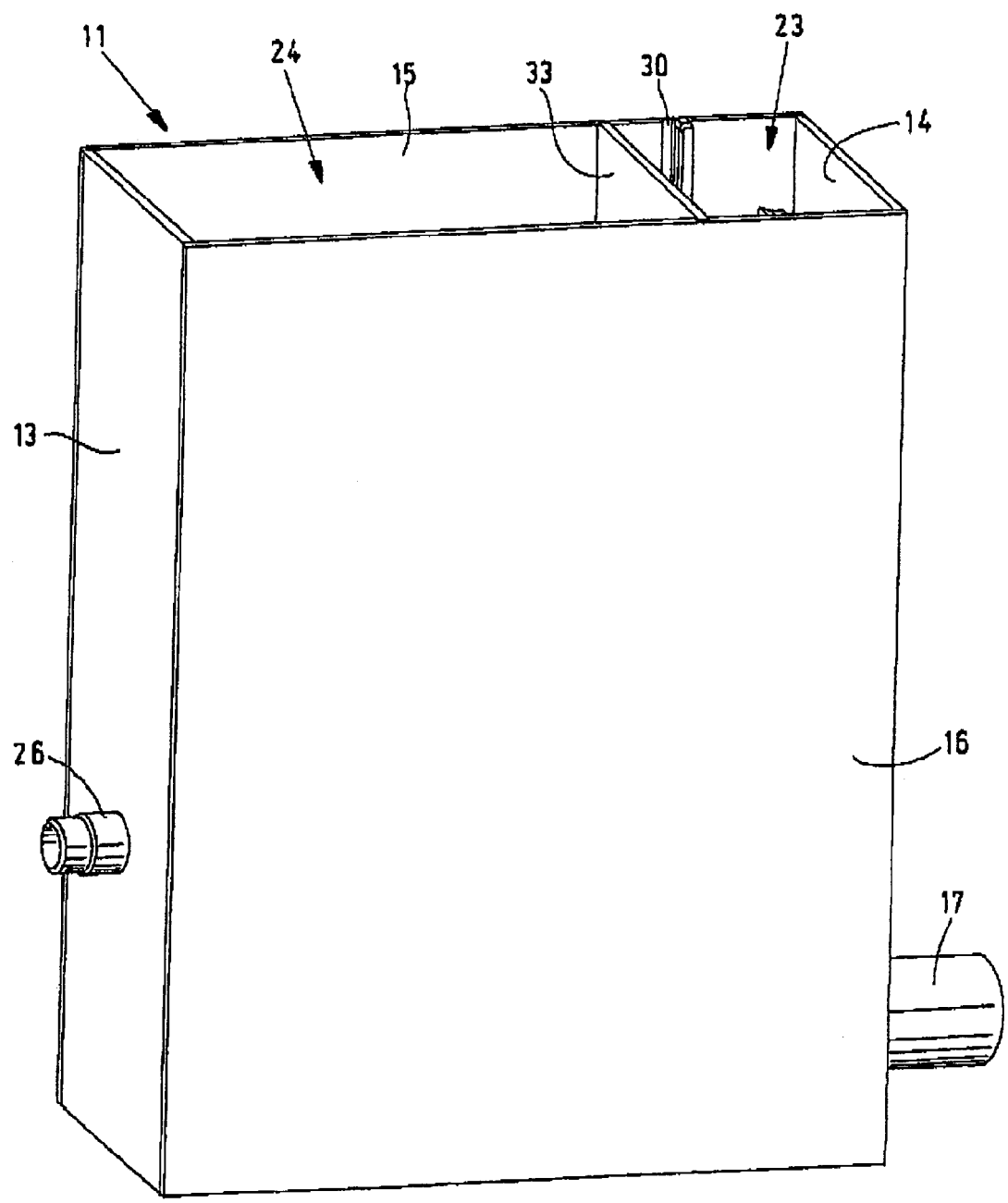
FIG. 2 is a perspective view of the isolated device.

FIG. 2 shows the isolated screening device 3. The screening device 3 comprises a container 11 substantially consisting of a rectangular bottom 12 (also refer to figure 3) and short upright side walls 13, 14 and long upright side walls 15, 16 that join the peripheral edges thereof. The upper side of the container 11 is open, which is not essential but which is convenient for maintenance reasons. It will also be possible in this context for the upper side to be closed by a removable cover. Present near the bottom of the short upright side wall 14 is a connection for the pipe 6. Present near the bottom of the long upright side wall 15 is a hole 18 for connection to the pipe 7.

Figure 3:
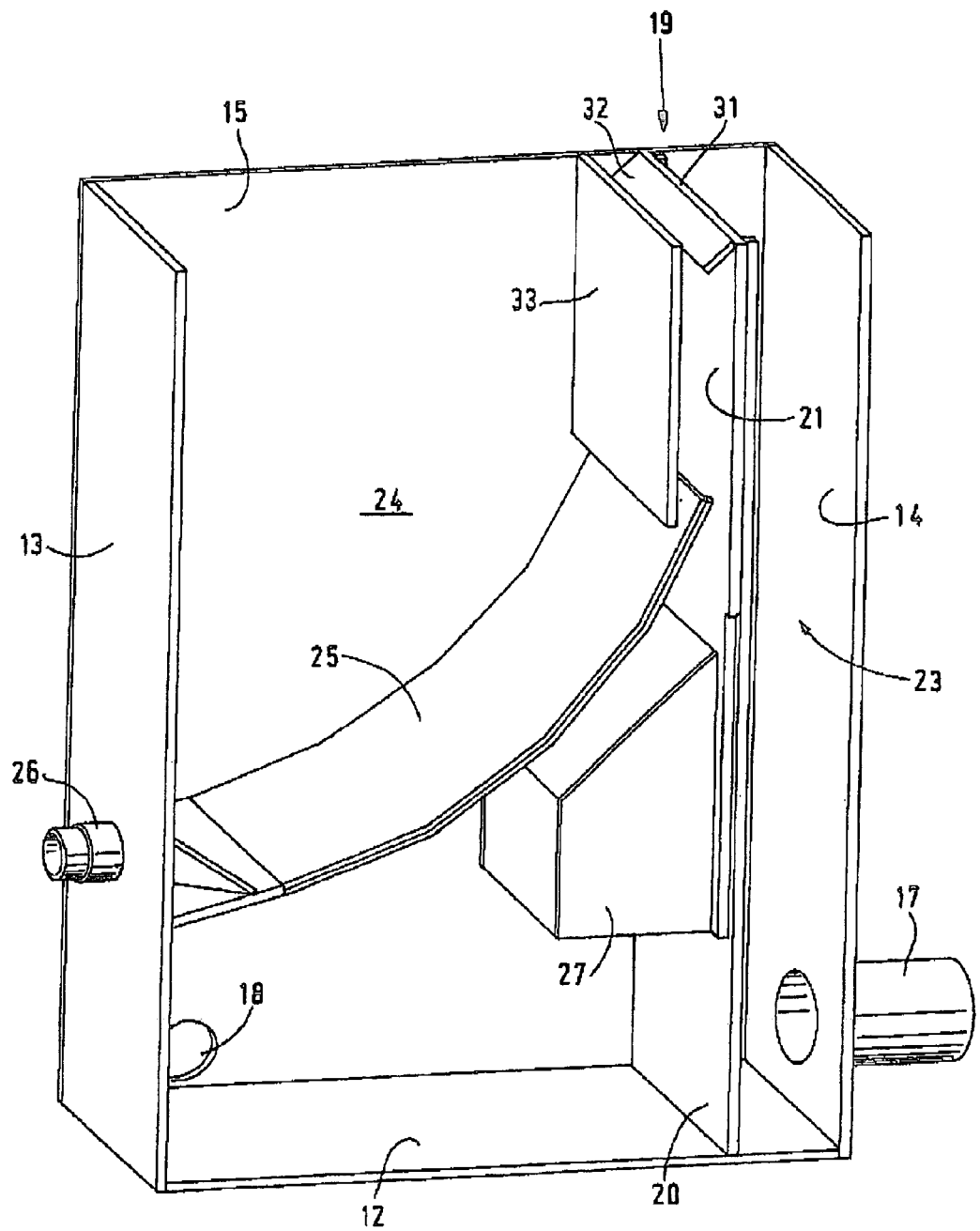
FIG. 3 shows the device of FIG. 2 without a side plate, so that the interior is exposed to view, with the overflow edge in a high position.
Figure 4:
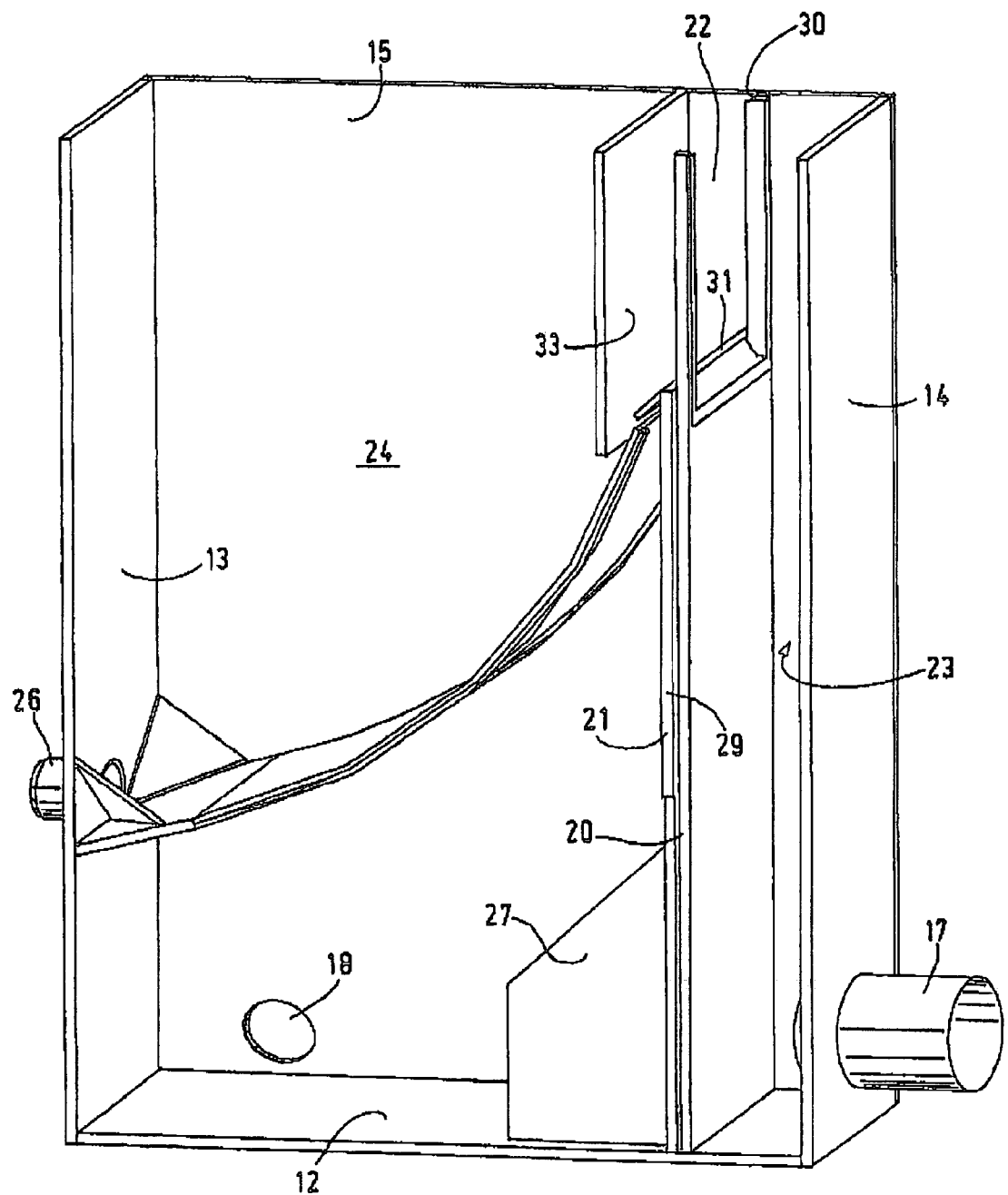
FIG. 4 is a different side elevation of FIG. 3, with the overflow edge in a low position.

Present in the interior of the container 11, extending parallel to the short upright side walls 13, 14, is an upright partition 19. The partition 19 comprises a fixed wall portion 20 and a wall portion 21 that can move up and down along the fixed wall portion 20. Sealing means are present between the fixed wall portion 20 and the movable wall portion 21, which sealing means function to prevent water from finding its way between the fixed wall portion and the movable wall portion at the location where said wall portions join each other. The fixed wall portion 20 is provided with a recess 22 (see FIG. 4) at the upper side. In the uppermost position of the movable wall portion 21, said recess 22 is fully closed by the movable wall portion 21, as can be seen in FIG. 3. In the lowermost position of the movable wall portion 21 according to FIG. 4, the recess 22 is substantially entirely released by the movable wall portion.

The partition 19 divides the interior of the container 11 into two compartments, viz. the buffer compartment 23 between the short upright side wall 14 and the partition 19 and the screen compartment 24 between the partition 19 and the upright side wall 13. Present in the screen compartment 24 is a convexly curved screen bend 25, which starts more or less near the bottom side of the recess 22 and ends at about ⅓ the height of the vertical upright side wall 13, at which location a connector 26 is provided just above the screen bend 25 for discharging material which has not passed through the screen bend 25 from the top to the bottom but which has moved down along the upper side thereof to the connector 26.

A floating element 27 is connected to the movable side wall portion 21 at the bottom side thereof. The floating element 27 comprises a volume that is hermetically sealed from its environment, which volume has been formed by joining a number of plate members in an airtight manner along their circumferential edges, one of which plate members is formed by a part of the movable wall portion 21. Movement in vertical direction of the movable wall portion 21 takes place as the floating element 27 floats in screened pond water in the screen compartment 24. As the liquid level 28 (FIG. 1) in the screen compartment 24 rises or falls, the movable wall portion 21, too, will move up and down. To ensure that said movement will take place in an unequivocal manner, approximately the upper half of the movable wall portion 21 is slightly wider than the fixed wall portion 20, so that edges 29 of the movable wall portion 21 project beyond the fixed wall portion 20 on either side, which projecting edges 29 extend into respective grooves 30 formed in the facing sides of the side walls 15, 16.

At the upper side, the movable side wall portion 21 is provided with an overflow edge 31 comprising a guide strip 32 that slopes down from the overflow edge 31 in the direction of the screen compartment 24. A splash guard 33 is disposed opposite the recess 22 in the buffer compartment 24, which splash guard functions to ensure that water which flows from the buffer compartment 23 over the overflow edge 31 into the screen compartment 24 will fall onto the screen bend 25 directly at the beginning thereof, so that said screen bend will have a maximum effect. A factor that also contributes to a smooth flow of the liquid over the overflow edge 31 is the low position of the connector 17 for the supply of pond water via the pipe 6.

The screening device 3 functions as follows. Since the pond 1 and the buffer compartment 23 in the container 11 of the screening device 3 are in communication with each other via the pipe 6, the liquid level 34 in the pond 1 will be the same as the liquid level 35 in the buffer compartment 23. This is not a dynamic equilibrium, however, because of the action of the pump 4. The fact is that the pump 4 on the one hand causes the liquid level 28 in the screen reservoir 24 to fall, as a result of which also the floating element 27 and the overflow edge 31 will move downwards. This leads to an increased amount of liquid flowing from the buffer compartment 23 over the overflow edge 31 into the screen compartment 24, as a result of which the liquid level 28 in the screen compartment 24 will rise again, so that eventually the overflow edge 31 will tend to move upwards more. On the other hand, because of the action of the pump 4, the level 34 of the liquid in the pond 1 and thus the level 35 of the liquid in the buffer compartment 23 will increase as well, as a result of which a large amount of liquid will flow from the buffer compartment 23 over the overflow edge 31 into the screen compartment. This in turn will cause the liquid level 28 in the screen compartment 24 to increase, as a result of which the movable wall portion 21 will move up on account of the fact that the floating element 27 floats on the liquid, so that the overflow edge 31 will be positioned at a higher level and less water will flow from the buffer compartment 23 over the overflow edge 31 into the screen compartment 24. The result is a substantially constant difference between the liquid level 28 in the screen compartment 24 and the liquid level 35 in the buffer compartment.

Figure 5:
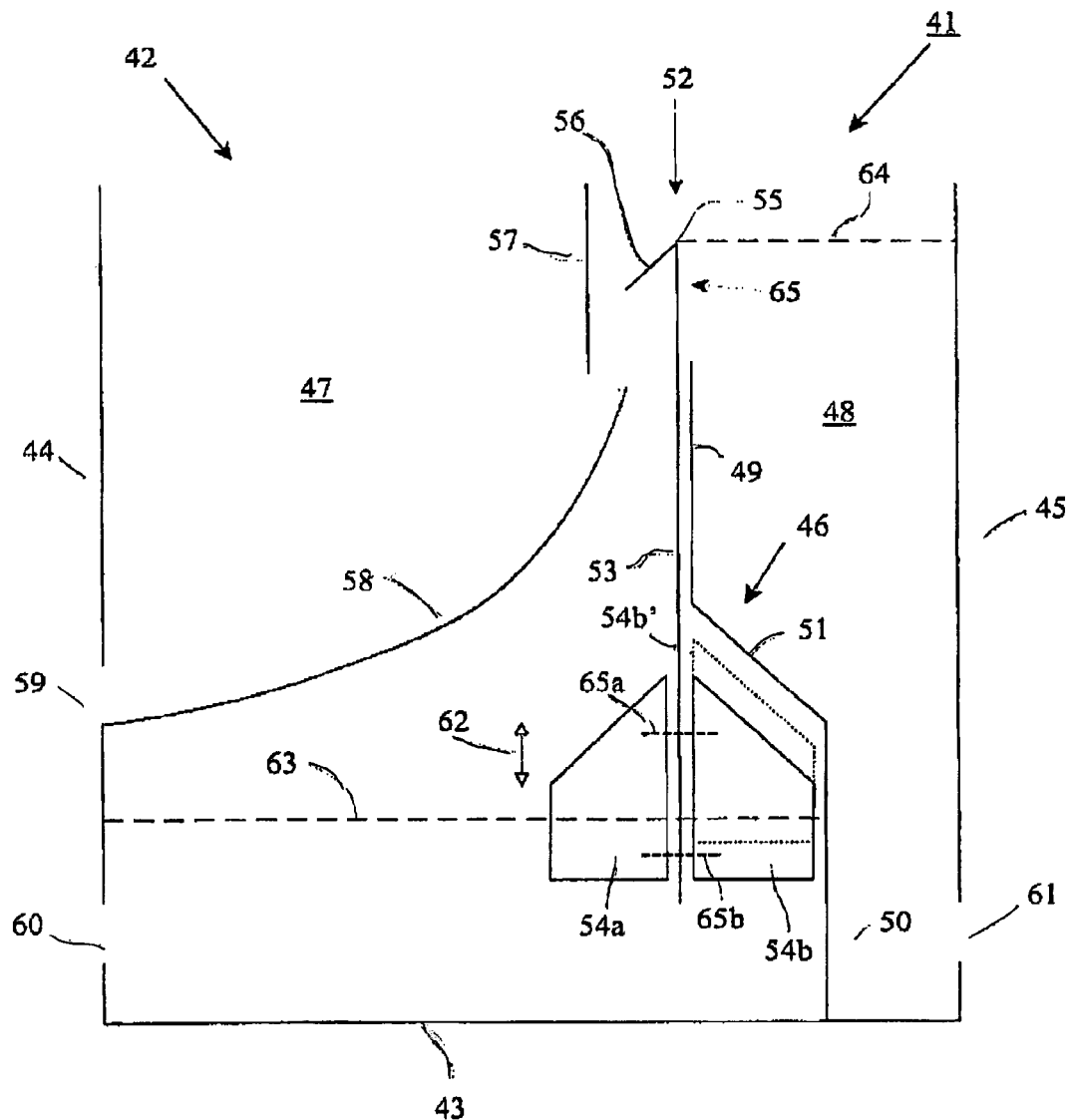
FIG. 5 is a schematic view in vertical longitudinal section of another preferred embodiment of a device according to the invention.

FIG. 5 shows a screening device 41 according to another preferred embodiment of the invention. The screening device 41 comprises a container 42 provided with a bottom 43 and side walls 44, 45 joining said bottom. Between said side walls 44, 45, other side walls comparable to the side walls 15, 16 of the screening device 11 extend. Within the container 42 an upright partition 52 extends, which substantially consists of a fixed wall portion 46 and a movable wall portion 53 that is capable of up-and-down in vertical direction. The partition 52 divides the interior of the container 42 into a buffer compartment 48 and a screen compartment 47. A screen bend 58 extends within the screen compartment, which screen bend terminates at the outlet 59 in the side wall 44 at its lower end for discharging material that was unable to pass the screen bend 58 in vertical direction. The upper edge of the movable wall portion 53 forms an overflow edge 55, from where a guide chute 56 slopes down in the direction of the screen compartment 47. Furthermore, a splash guard 57 is provided.

The fixed wall portion 46 consists of a vertical wall segment 50, a vertical wall segment 49, which extends at a larger distance from the upright side wall 45 than the wall segment 50, and a sloping wall segment that connects the upper side of the wall segment 50 to the bottom side of the wall segment 49. Sealing means (not shown) are provided between the wall segment 49 and the movable wall portion 53. At the upper side, the fixed wall portion 46 is provided with a recess 65 comparable to the recess 22 of the screening device 3 (see FIG. 4). Said recess 65 is partially closed by the upper side of the movable wall portion 53 in FIG. 5. Liquid, such as pond water, is supplied to the buffer reservoir 48 via the inlet opening 61, so that said buffer reservoir is filled up to the level 64, which corresponds to the level of the overflow edge 55.

At the bottom side of the movable wall portion 53, two mirror-symmetrical separate floating bodies 54a, 54b are detachably connected thereto by connecting means 65a, 65b (schematically represented), which may comprise pins, for example, which are passed through holes in the movable wall portion 53. The provision of several of said holes in vertical direction makes it possible to connect the floating bodies 54a, 54b to the movable wall portion 53 at different vertical positions as indicated by the double arrow 62 and as schematically indicated by numeral 54b ' for the floating element 54b. In this way the distance between the floating bodies 54a, 54b and the overflow edge 55 (and thus the distance between the liquid levels 63, 64) can be optimally geared to the environment within which the screening device 41 functions. It is possible to connect the floating bodies 54a, 54b to either side of the movable wall portion 53 because space has been created for that purpose in that the fixed wall portion 46 springs back at its bottom side in the direction of the upright wall 45. An important advantage in this connection is that the line of action of the vertical floating forces extends through the movable wall portion 53, and thus through the overflow edge 55. Consequently, the movable wall portion 53 does not exhibit any tendency to tilt about an axis perpendicular to the plane of drawing.

It will be understood by those skilled in the art that instead of using separate floating bodies 54a, 54b, it is also possible to use a single floating body, which may or may not be vertically adjustable along the movable wall portion 53 and which is preferably disposed mirror-symmetrically with respect to the movable wall portion 53.

Because liquid flows over the overflow edge 55, the screen compartment 47, too, is filled with water up to the liquid level 63. A rise or a fall of the liquid level 63 results in the overflow edge 55 rising or falling to the same extent, as a result of which also the liquid level 64 in the buffer compartment 48 will rise. The screen compartment 47 is provided with an outlet 60, downstream of which a pump (not shown) is disposed, just like in FIG. 1.

The invention claimed is:

1. A device for the metered passage of a liquid, comprising a container for the liquid, said container comprising
    an inlet and an outlet for supplying liquid to and discharging liquid from the container, respectively,
    a bottom and upright side walls joining said bottom,
    metering means for regulating the extent to which liquid is supplied to the container via the inlet in dependence on the amount of liquid that is present in the container, said metering means comprising a floating element which floats on the liquid in the container and which is rigidly connected to an overflow edge that can move up and down together with the floating element between a lowermost position and an uppermost position, over which overflow edge the liquid flows into the container at the location of the inlet, and a cleaning element located above the floating element, for cleaning liquid that flows from the inlet to the outlet, and wherein the overflow edge forms part of at least one side wall of the container.

2. A device according to claim 1, characterized in that said at least one side wall, of which the overflow edge forms part, comprises a fixed side wall portion and a movable side wall portion capable of movement along said fixed side wall portion, with the upper edge of the movable side wall portion forming the overflow edge.

3. A device according to claim 2, characterized in that the movable side wall portion is located on the side of the fixed side wall portion that faces towards the interior of the container.

4. A device according to claim 2 or 3, characterized in that the floating element is directly attached to the movable side wall portion.

5. A device according to claim 2, characterized in that guide means are provided for guiding the movement of the movable side wall portion along the fixed side wall portion.

6. A device according to claim 5, characterized in that said guide means comprise grooves on sides of the two side walls that face towards the interior of the container, within which grooves edges of the movable side wall portion are slidably accommodated.

7. A device according to claim 1, characterized in that a buffer container comprising a bottom and upright side walls joining said bottom is provided for keeping liquid upstream of the inlet of the container.

8. A device according to claim 7, characterized in that said at least one side wall of the container of which the overflow edge forms part also forms a side wall of the buffer container.

9. A device according to claim 7 or 8, characterized in that the bottom of the container and the bottom of the buffer container are in line and/or that at least one side wall of the container and at least one side wall of the buffer container are in line.

10. A device according to claim 7 or 8, characterized in that the buffer container has an inlet that is provided in the lower half of an upright side wall thereof.

11. A device according to claims 1 or 7, characterized in that the floating element is provided directly below the overflow edge.

12. A device according to claims 1 or 7, characterized in that adjusting means are provided for adjusting the distance between the floating element and the overflow edge.

13. A device according to claims 1 or 7, characterized in that the overflow edge, in the uppermost position thereof, is positioned maximally 1.0 cm below the upper sides of side walls of the container without overflow edge.

* * * * *